United States Patent
Schmitt

(10) Patent No.: US 7,502,680 B2
(45) Date of Patent: Mar. 10, 2009

(54) METHOD AND DEVICE FOR INFLUENCING DRIVING TORQUE

(75) Inventor: Johannes Schmitt, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 1087 days.

(21) Appl. No.: 10/484,475

(22) PCT Filed: Mar. 20, 2003

(86) PCT No.: PCT/DE03/00924

§ 371 (c)(1),
(2), (4) Date: Jun. 15, 2004

(87) PCT Pub. No.: WO03/097399

PCT Pub. Date: Nov. 27, 2003

(65) Prior Publication Data

US 2004/0211609 A1    Oct. 28, 2004

(30) Foreign Application Priority Data

May 18, 2002    (DE) ................................ 102 22 198

(51) Int. Cl.
B60L 15/10    (2006.01)
(52) U.S. Cl. ........................................ 701/84; 180/197
(58) Field of Classification Search ................ 701/93, 701/101, 102, 110, 113; 180/197
See application file for complete search history.

(56) References Cited

U.S. PATENT DOCUMENTS

| | | | |
|---|---|---|---|
| 5,980,428 A * | 11/1999 | Liu | 477/180 |
| 6,549,840 B1 | 4/2003 | Mikami et al. | |
| 6,679,807 B2 * | 1/2004 | Kato et al. | 477/107 |
| 7,032,697 B2 * | 4/2006 | Lee | 180/65.2 |
| 7,206,682 B2 * | 4/2007 | Bodin et al. | 701/67 |
| 2002/0033642 A1 * | 3/2002 | Holl | 303/191 |

FOREIGN PATENT DOCUMENTS

| | | |
|---|---|---|
| DE | 41 12 141 | 10/1992 |
| DE | 196 32 621 | 11/1997 |
| EP | 0 511 473 | 11/1992 |
| EP | 1 000 794 | 5/2000 |
| JP | 6221199 | 8/1994 |
| JP | 09284917 A * | 10/1997 |
| JP | 11205912 A * | 7/1999 |
| JP | 2001171378 | 6/2001 |
| WO | WO 99/55565 | 11/1999 |

* cited by examiner

*Primary Examiner*—Kevin Hurley
(74) *Attorney, Agent, or Firm*—Kenyon & Kenyon LLP

(57) ABSTRACT

A method and a device for influencing the drive torque of a motor vehicle during a standing-start operation in the sense of a positive vehicle longitudinal acceleration, in which
 a measure of the drive torque requested by the driver is predefined via at least one accelerator-pedal position; and
 the drive torque of the motor vehicle is increased beyond the measure requested by the driver, independently of the driver.

12 Claims, 2 Drawing Sheets

METHOD AND DEVICE FOR INFLUENCING DRIVING TORQUE

BACKGROUND INFORMATION

German Patent Application No. 41 12 141 describes a traction control system that includes brake control and, if applicable, slip control as well. To facilitate the transition from stationary to mobile state, a drive wheel is braked prior to driveaway. If the non-braked wheel spins, the brake pressure at the braked wheel is reduced.

This traction control system assumes that the driver activates the accelerator pedal with sufficient force during the driveaway operation. This point is of special importance in an uphill standing-start operation.

Not taken into account, however, is the eventuality that the driver fails to activate the accelerator pedal with sufficient force.

SUMMARY OF THE INVENTION

The present invention is directed to a method for influencing the drive torque of a vehicle during a standing-start operation, in the sense of a positive vehicle longitudinal acceleration in which
- a measure of the drive torque requested by the driver is predefined via at least one accelerator-pedal position; and
- the drive torque of the vehicle is increased beyond the measure requested by the driver, independently of the driver.

A particular advantage of the present invention is to be seen in the fact that an inexperienced driver, who may not activate the accelerator with sufficient force when setting the vehicle in motion, is provided with valuable assistance. In this context, the term "positive vehicle acceleration" is understood to mean that the vehicle speed increases in the desired driving direction (i.e., the standing-start direction).

An advantageous specific embodiment is characterized by an increase in the drive torque during the standing-start operation in those instances when
- a detected driver command is present; and
- the need for assistance in a standing-start operation is detected.

In this way, it is ensured that the method according to the present invention is implemented only when actually required. A seasoned driver, on the other hand, will not be deprived of control over the standing-start operation.

An advantageous development recognizes the need for assistance in a standing-start operation in those instances when
- the standing-start operation of the vehicle occurs at an inclined surface, in an uphill direction; and
- the drive torque requested by the driver via at least one accelerator-pedal position fails to achieve acceleration of the vehicle in the uphill direction.

Especially moving from a standstill in an uphill direction poses a challenge to a driver lacking experience. For this reason, this offers an important field of application for the present invention.

It is advantageous if a standing-start command of the driver is detected by an evaluation of the accelerator-pedal position. This is related to the fact that the position of the accelerator pedal is monitored in a vehicle anyway, since this information is required for the engine control device. For this reason, no substantial additional expense for a sensory system is required in this refinement.

An additional specific embodiment is characterized by the fact that the drive torque of the vehicle is increased up to a threshold value, beyond the measure desired by the driver, and independently of the driver, the threshold value being determined from at least the vehicle mass or the gradient of the inclined surface or the coefficient of friction of the road or the drive slip. The gradient of the inclined surface may be determined, for example, by a lateral-acceleration sensor oriented in the longitudinal direction.

An advantageous specific embodiment is distinguished by the fact that, on the basis of the drive torque requested by the driver via at least one accelerator-pedal position, this drive torque is increased until the longitudinal acceleration of the vehicle has reached a predefinable threshold value. This prevents that the vehicle longitudinal acceleration assumes excessive values.

In an advantageous refinement of the present invention the drive torque is not increased further when excessive drive slip occurs. This is useful since a further increase in the drive slip would merely result in spinning of the wheels.

It is advantageous if the increase in the drive torque is implemented in such a way that the increased speed of the drive torque is reduced with increasing drive slip, thereby avoiding excessive drive slip.

An advantageous development is characterized in that, given an active traction control system (TCS), the standing-start operation is regulated by the traction-control system in a slip-optimizing manner.

The device according to the present invention for influencing the drive torque of a vehicle during the transition from a stationary to a mobile state in the sense of a positive vehicle acceleration includes
- detection means in which a measure of the drive torque requested by the driver is ascertained via at least one accelerator-pedal position; and
- booster means in which the drive torque of the vehicle is increased beyond the measure ascertained in the detection means, independently of the driver.

DETAILED DESCRIPTION

Figure 1:
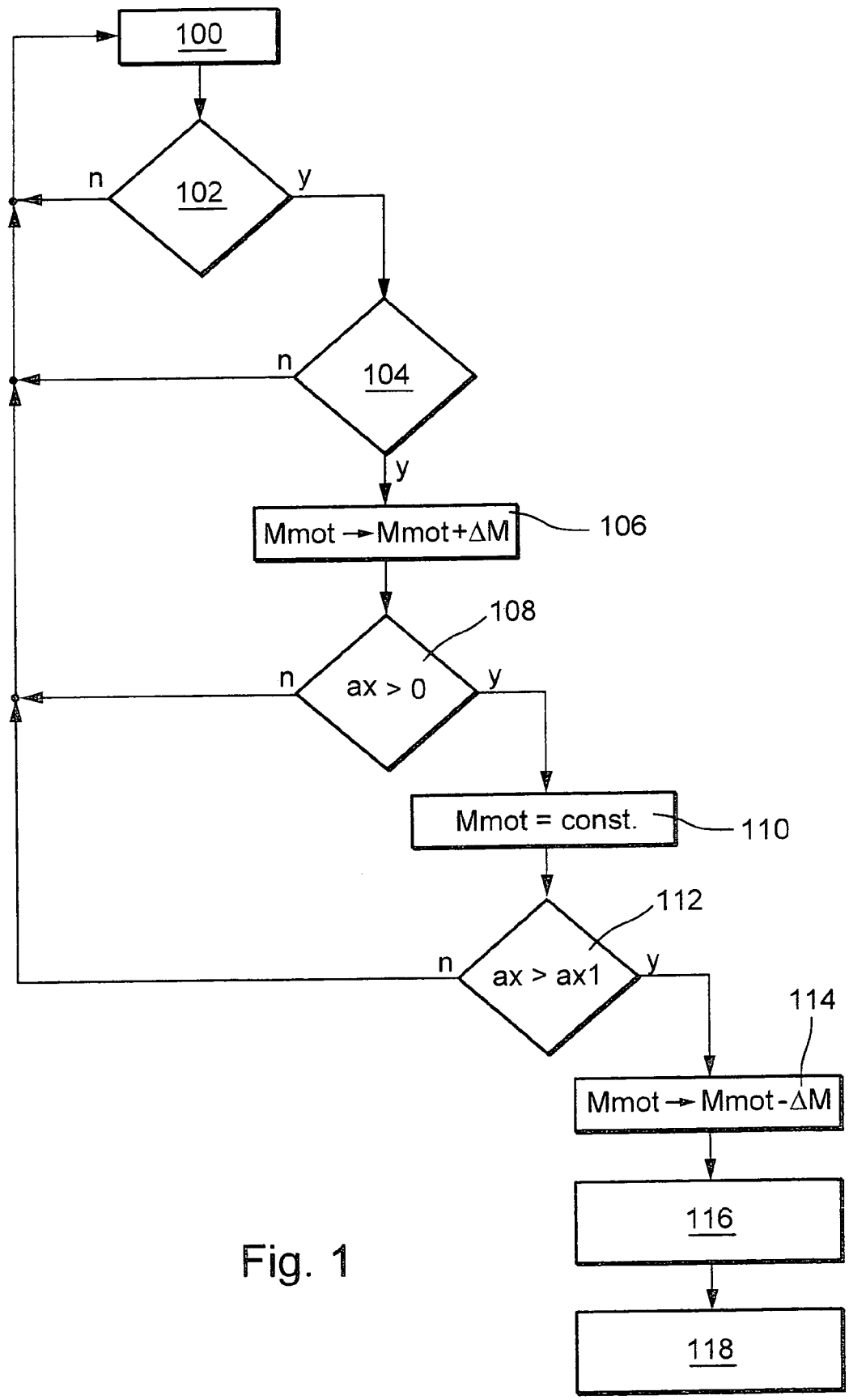
FIG. 1 shows the sequence of the method according to the present invention.

In presentations of ASR systems or ESP systems, it becomes apparent from time to time that some drivers do not depress the accelerator pedal with sufficient force when attempting, for example, to set a vehicle in motion at an incline. It also happens that, merely because of the acoustic noise of a spinning wheel, the driver does not depress the accelerator pedal further although this would be necessary for generating the locking torque required for the standing-start operation via a brake intervention. Conventional TCS systems (TCS=traction control systems) and electronic stability programs do not have the functionality of adjusting a drive torque that exceeds the driver input. An exception is the engine drag-torque control EDT, which, however, becomes active only in the event of brake slip at the drive wheels or in the case of a load change. In addition, the engine drag-torque control does not result in positive acceleration.

For this reason, in the present invention the drive torque that is set by the driver during the transition from standstill to driving is increased in an appropriate, situation-adapted manner until the standing-start operation has been concluded or is terminated. A prerequisite for activation is a detected standing-start command by the driver;
the need for standing-start assistance; and
a non-response of safety functions.

A standing-start command of the driver may be detected, for example, by checking whether the driver is activating the accelerator pedal and whether the engine torque simultaneously exceeds a threshold value.

The need for assistance in a standing-start operation may be determined, for example, from the gradient of the roadway (measurable, for example, via an acceleration sensor oriented in the vehicle longitudinal direction). On this basis, and also from knowledge of additional vehicle data (such as vehicle mass), the minimum engine torque necessary for a transition from stationary to mobile state may be calculated. Standing-start assistance is required when, for instance, the engine torque input by the driver is less than the calculated minimum engine torque. The need for standing-start assistance may also exist if it is detected that the vehicle is rolling backward, despite the driver activating the accelerator pedal.

The drive torque may be boosted in a number of ways:
1. The driver's desired torque is modified. In this case, the driver's desired torque is predefined via the position of the accelerator pedal.
2. The EDT function path is utilized;
3. The Tempomat function path is utilized;
4. The accelerator-pedal characteristic is modified;
5. The increase in the drive torque may be implemented by switching in additional drive sources, such as an electromotor.

The term "Tempomat" denotes a vehicle-speed control that maintains a desired speed predefined by the driver. If, for example, the road gradient changes during the ride, from level to inclined, the Tempomat is able to automatically increase the engine torque (so as to hold the speed constant). If a vehicle control device already includes the MSR functionality or a Tempomat functionality, this functionality may be used for the present invention as well.

In the case of an implementation in a TCR system or an electronic stability program, the MSR path offers itself as a possibility. The torque to be boosted may be determined by calculating the standing-start resistance (i.e., the required standing-start torque) or by iteration (addition and reducing routine, cf. FIG. 1). The TCS and ESP functions may then become active in a known manner and implement the slip-controlled transition from stationary to mobile state. In this way, it is easier for a driver inexperienced in such situations to set the vehicle in motion or, in some instances, even makes it possible in the first place.

The procedure according to the present invention is represented in FIG. 1 in the form of a block diagram. The method starts in block 100. It is then determined in block 102 whether a driver-side standing-start command is present. In this case, it is branched to block 104; if there is no such command, it is branched back to block 100.

In block 104, it is checked whether standing-start assistance is needed. If standing-start assistance is necessary, it is moved to block 106; if standing-start assistance is not required, it is branched back to block 100.

In block 106, engine torque Mmot is increased by the amount ON!, i.e., Mmot=Mmot+AM. After block 106, it is moved to block 108, where a check is carried out whether the vehicle is accelerating. For this purpose, a query ax>O takes place, ax denoting the vehicle longitudinal acceleration.

If ax>O is satisfied, it is branched to block 110; however, if the condition in block 108 has not been satisfied, a return to block 100 takes place. In block 110, the engine torque is held constant, i.e., Mmot=constant. Subsequent to block 110, a check ax>ax1 takes place in block 112, ax1 being an upper limit value for the vehicle longitudinal acceleration. If ax is less than ax1, it is returned to block 100 and the method begins again. However, if ax>ax1 is satisfied, the engine torque is reduced in block 114: Mmot=Mmot−AM. Block 116 is implemented after block 114. In block 116, TCS or ESP functions are realized, such as brake interventions, for example. The method according to the present invention ends in block 118 and then optionally begins again in block 100.

It should also be stressed that the increase in the engine torque in block 106 or the reduction in the engine torque in block 114 need not necessarily be by the same amount in each case.

It is also conceivable to implement an increase Mmot=Mmot+4M1 in block 106 and a reduction Mmot=Mmot−OM2 in block 114, M1 and M2 differing from one another.

The maximally allowed engine torque Mmot1 is tied to the maximally allowed acceleration ax1 via the Newton's Equation of Motion. If the engine torque is known, it is possible to determine the acceleration resulting from the engine torque from, for example, the gradient of the roadway (measurable, for instance, via an acceleration sensor oriented in the vehicle longitudinal direction), the vehicle mass, frictional forces, etc. If a maximum acceleration ax1 is allowed, a maximum engine torque Mmot1 will result therefrom.

In a preferred specific embodiment, the increase in the engine torque in block 106 may be interrupted if the drive slip already registers an excessive value, i.e., when the drive slip exceeds a threshold value. In this context, the number of wheels at which the drive slip is excessive may also be taken into account. For example, it is conceivable that in those cases where the drive slip is excessive only at one wheel, the engine torque continues to be increased, namely until excessive drive slip is present at two wheels. This means that drive slip that occurs only at one wheel is not taken into account. It is also conceivable that drive slip occurring at only one wheel leads to a lower increased speed of the engine torque, that is, excessive wheel slip occurring only at one wheel is taken into account to a lesser degree than excessive drive slip occurring at two wheels simultaneously.

When the drive-slip value increases, the increased speed of the engine torque (i.e., the increase gradient) is reduced. Even in an active traction control (TCS), the engine torque increase beyond the driver specification will be maintained as long as the standing-start command of the driver is sensed.

Figure 2:
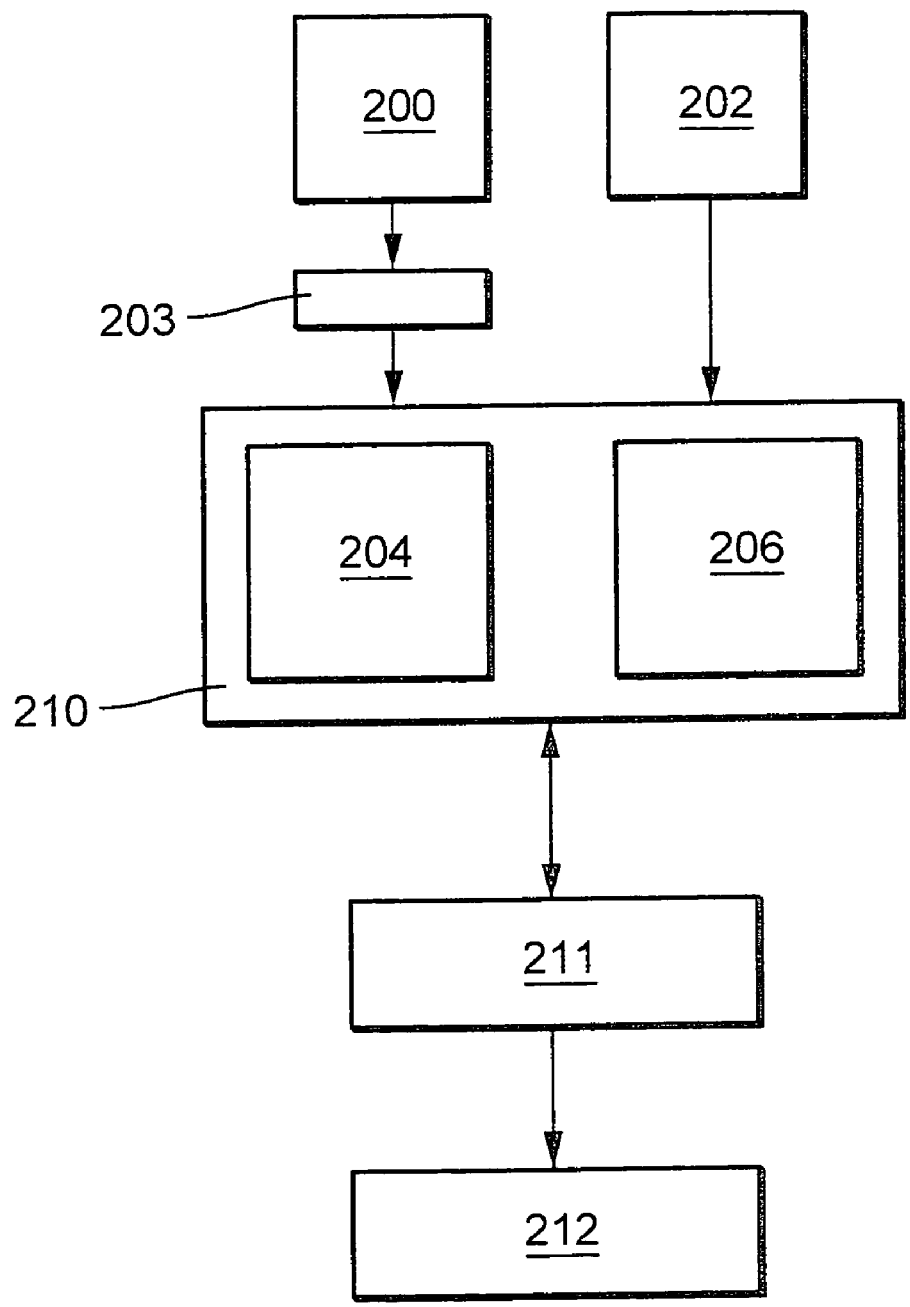
FIG. 2 shows the configuration of the device according to the present invention.

The configuration of the device according to the present invention is shown in FIG. 2. The blocks have the following meanings:

block 200: driver
block 202: sensory system
block 203: detection means
block 204: booster means
block 206: further TCS components
block 210: TCS control device
block 211: engine control unit
block 212: actuator (for example, throttle valve)

The driver command regarding the engine torque is predefined by the driver in block 200 via the accelerator-pedal position. The output signals are forwarded to block 203. The accelerator-pedal position is evaluated in detection means 203 and supplied to TCS control device 210. TCS control device 210 has two essential components:

1. Booster means 204, which allow the engine torque to be increased beyond the driver command; and
2. Block 206, which includes all additional TCS components.

The output signals of sensory system 202 are supplied to TCS control device 210 as well.

TCS control device 210 interacts with engine control unit 211, which in turn triggers actuators 212 (such as a throttle valve).

What is claimed is:

1. A method for influencing a drive torque of an engine in a vehicle during a standing-start operation in the sense of a positive vehicle longitudinal acceleration, the method comprising:
    receiving a request for an amount of drive torque from a driver of the vehicle, the request being input into a control system of the vehicle via at least one accelerator-pedal position; and
    increasing the drive torque of the engine beyond the measure requested by the driver and to an amount sufficient to transition the vehicle from a stationary state to a mobile state, independently of the driver.

2. The method according to claim 1, wherein the increase in the drive torque during the standing-start operation is implemented only if (a) the request indicates a desire of the driver to perform a standing-start, and (b) a need for standing-start assistance is determined by the control system as a function of a least one of a vehicle condition and a road condition.

3. The method according to claim 2, wherein the need for standing-start assistance is determined when (a) the standing-start operation of the vehicle takes place at an incline, headed in an incline direction, and (b) the drive torque requested by the driver via the at least one accelerator-pedal position fails to achieve an acceleration of the vehicle in an uphill direction.

4. The method according to claim 2, wherein the desire to perform the standing-start operation is detected by evaluating a position of an accelerator pedal of the vehicle.

5. The method according to claim 1, wherein the drive torque is increased beyond the measure requested by the driver, independently of the driver, up to a threshold value, which is determined from at least one of a vehicle mass, a gradient of an inclined surface, a coefficient of friction of a road surface and a drive slip.

6. The method according to claim 1, wherein, based on the drive torque requested by the driver via the at least one accelerator-pedal position, the drive torque is increased until the vehicle longitudinal acceleration reaches a predefined threshold value.

7. The method according to claim 1, wherein the drive torque is not increased further when a drive slip of at least two wheels exceeds a threshold value.

8. The method according to claim 1, wherein the increase in the drive torque is implemented in such a way that a rate of the increase in the drive torque decreases with an increase in a drive slip of no more than one wheel above a threshold value.

9. The method according to claim 7, wherein the control system is a traction control system configured to correct drive slip of at least one wheel by influencing the drive torque.

10. A device for influencing a drive torque of an engine in a motor vehicle during a standing-start operation in the sense of a positive vehicle acceleration, the device comprising:
    detection means for ascertaining a measure of the drive torque requested by a driver of the vehicle via at least one accelerator-pedal position; and
    a control device configured to receive the measure ascertained in the detection means, the control device including booster means for increasing the drive torque of the engine beyond the measure ascertained in the detection means and to an amount sufficient to transition the vehicle from a stationary state to a mobile state, independently of the driver.

11. The method according to claim 8, wherein the drive torque is not increased further when a drive slip of at least two wheels exceeds a threshold value.

12. A method for influencing a drive torque of an engine in a vehicle during a standing-start operation in the sense of a positive vehicle longitudinal acceleration, the method comprising:
    receiving a request for an amount of drive torque from a driver of the vehicle, the request being input into a control system of the vehicle via at least one accelerator-pedal position; and
    determining, as a function of a position of an accelerator pedal of the vehicle, whether the driver desires to perform the standing-start operation;
    determining a need for standing-start assistance when the standing-start operation takes place on an incline, the vehicle is headed in a direction of the incline, and the drive torque requested fails to achieve an acceleration of the vehicle in an uphill direction;
    responsive to the determination of the need for standing-start assistance, increasing the drive torque of the engine beyond the measure requested by the driver and to an amount sufficient to transition the vehicle from a stationary state to a mobile state, independently of the driver, wherein the drive torque is increased up to a threshold value, the threshold value corresponding to a maximum allowable longitudinal acceleration of the vehicle and determined from at least one of a vehicle mass, a gradient of an inclined surface, a coefficient of friction of a road surface and a drive slip;
    measuring a drive slip of all the wheels of the vehicle;
    decreasing a rate of the increase in the drive torque when the drive slip of no more than one wheel exceeds a first threshold value; and
    preventing any further increase to the drive torque when a drive slip of at least two wheels exceeds a second threshold value.

\* \* \* \* \*